US010635096B2

(12) United States Patent
Srinivasan et al.

(10) Patent No.: US 10,635,096 B2
(45) Date of Patent: Apr. 28, 2020

(54) METHODS FOR ANALYTICS-DRIVEN ALARM RATIONALIZATION, ASSESSMENT OF OPERATOR RESPONSE, AND INCIDENT DIAGNOSIS AND RELATED SYSTEMS

(71) Applicant: Honeywell International Inc., Morris Plains, NJ (US)

(72) Inventors: Srikant Srinivasan, Bangalore (IN); Viraj Srivastava, New Delhi (IN); Karthikeyan Sundarasamy, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/588,056

(22) Filed: May 5, 2017

(65) Prior Publication Data

US 2018/0322770 A1  Nov. 8, 2018

(51) Int. Cl.
*G05B 23/02* (2006.01)
(52) U.S. Cl.
CPC .................. *G05B 23/0272* (2013.01)
(58) Field of Classification Search
CPC .............. G08B 29/02; G08B 25/001
See application file for complete search history.

(56) References Cited

U.S. PATENT DOCUMENTS

| 5,287,390 A | 2/1994 | Scarola et al. |
| 5,353,315 A | 10/1994 | Scarola et al. |
| 5,398,277 A * | 3/1995 | Martin, Jr. ........... G08B 25/001 379/309 |
| 5,581,242 A | 12/1996 | Arita et al. |
| 5,617,311 A | 4/1997 | Easter et al. |
| 5,768,119 A | 6/1998 | Havekost et al. |
| 5,821,440 A | 10/1998 | Khater et al. |
| 6,308,141 B1 * | 10/2001 | Saito ...................... B29C 45/76 425/542 |
| 6,356,282 B2 | 3/2002 | Roytman et al. |
| 6,437,812 B1 | 8/2002 | Giles et al. |

(Continued)

FOREIGN PATENT DOCUMENTS

| EP | 0959398 A1 | 11/1999 |
| EP | 0906629 B1 | 2/2003 |

(Continued)

OTHER PUBLICATIONS

Litt, "Steve Litt's PERLs of Wisdom: PERL Regular Expressions (With Snippets)", 2003, 8 pages.

(Continued)

*Primary Examiner* — Joseph H Feild
*Assistant Examiner* — Rufus C Point

(57) ABSTRACT

A method includes identifying changes in an alarm count for at least one alarm to be generated in an industrial process control and automation system. The changes in the alarm count are based on a plurality of different sets of alarm settings. The method also includes presenting the changes in the alarm count to a user and receiving a selection of one of the sets of alarm settings. The method further includes configuring the industrial process control and automation system with the selected set of alarm settings to enable the industrial process control and automation system to generate alarms using the selected set of alarm settings.

20 Claims, 14 Drawing Sheets

(56) References Cited

U.S. PATENT DOCUMENTS

| | | | |
|---|---|---|---|
| 6,462,652 B1* | 10/2002 | McCuen | G08B 25/10 340/3.1 |
| 6,535,122 B1 | 3/2003 | Bristol | |
| 6,690,274 B1* | 2/2004 | Bristol | G05B 23/0267 340/506 |
| 6,774,786 B1* | 8/2004 | Havekost | G05B 23/0272 340/500 |
| 6,845,336 B2 | 1/2005 | Kodukula et al. | |
| 7,000,193 B1 | 2/2006 | Impink, Jr. et al. | |
| 7,250,856 B2* | 7/2007 | Havekost | G05B 23/0272 340/500 |
| 7,352,279 B2 | 4/2008 | Yu et al. | |
| 7,388,482 B2 | 6/2008 | Dousson et al. | |
| 7,428,300 B1 | 9/2008 | Drew et al. | |
| 7,496,591 B2 | 2/2009 | Mets et al. | |
| 7,679,504 B2 | 3/2010 | Wang et al. | |
| 7,945,817 B1 | 5/2011 | Usery et al. | |
| 7,961,087 B2* | 6/2011 | Hoveida | G06F 11/3072 340/500 |
| 2001/0019328 A1 | 9/2001 | Schwuttke et al. | |
| 2002/0012011 A1 | 1/2002 | Roytman et al. | |
| 2002/0022894 A1* | 2/2002 | Eryurek | G03F 7/0007 700/80 |
| 2002/0055790 A1* | 5/2002 | Havekost | G05B 23/027 700/80 |
| 2002/0099786 A1 | 7/2002 | Chun | |
| 2002/0154009 A1* | 10/2002 | McCuen | G08B 25/10 340/501 |
| 2002/0174083 A1 | 11/2002 | Hellerstein et al. | |
| 2002/0186261 A1 | 12/2002 | Giles et al. | |
| 2004/0176926 A1 | 9/2004 | Edie et al. | |
| 2005/0012608 A1* | 1/2005 | Havekost | G05B 23/0272 340/517 |
| 2005/0062598 A1* | 3/2005 | Akamatsu | G05B 23/027 340/506 |
| 2005/0179541 A1* | 8/2005 | Wolfe | G08B 13/2462 340/539.22 |
| 2005/0197806 A1* | 9/2005 | Eryurek | G05B 23/0221 702/188 |
| 2005/0235356 A1 | 10/2005 | Wang | |
| 2005/0248781 A1* | 11/2005 | Tin | H04N 1/6011 358/1.9 |
| 2006/0106797 A1 | 5/2006 | Srinivasa et al. | |
| 2007/0008099 A1 | 1/2007 | Kimmel et al. | |
| 2007/0033632 A1 | 2/2007 | Baynger et al. | |
| 2007/0142934 A1* | 6/2007 | Boercsoek | G05B 19/4185 700/23 |
| 2007/0194920 A1* | 8/2007 | Hollifield | G08B 25/00 340/572.1 |
| 2007/0211079 A1 | 9/2007 | Nixon et al. | |
| 2007/0268122 A1 | 11/2007 | Kow et al. | |
| 2008/0165151 A1 | 7/2008 | Lemay et al. | |
| 2008/0300698 A1* | 12/2008 | Havekost | G06F 9/4488 700/83 |
| 2009/0006903 A1 | 1/2009 | Devitt et al. | |
| 2009/0109860 A1 | 4/2009 | Cinato et al. | |
| 2010/0156654 A1 | 6/2010 | Bullemer et al. | |
| 2012/0188592 A1* | 7/2012 | Handley | G06F 3/121 358/1.15 |
| 2013/0002697 A1 | 1/2013 | Ashley et al. | |
| 2013/0063264 A1* | 3/2013 | Oktem | G05B 23/024 340/540 |
| 2014/0277612 A1* | 9/2014 | Justin | G05B 23/0291 700/80 |
| 2015/0254957 A1* | 9/2015 | Wilson | G16H 50/20 340/573.1 |
| 2016/0155309 A1* | 6/2016 | Watson | A61B 5/14552 600/324 |

FOREIGN PATENT DOCUMENTS

| | | |
|---|---|---|
| GB | 2275564 A | 8/1994 |
| GB | 2372365 A | 8/2002 |
| GB | 2395831 A | 6/2004 |
| GB | 2412449 A | 9/2005 |
| GB | 2419723 A | 5/2006 |
| GB | 2426355 A | 11/2006 |
| JP | 6242169 A | 9/1994 |
| JP | 2004192543 A | 7/2004 |
| KR | 20100043507 A | 4/2010 |
| WO | 2005067403 A2 | 7/2005 |
| WO | 2005109126 A1 | 11/2005 |
| WO | 2006000110 A1 | 1/2006 |
| WO | 2006058090 A2 | 6/2006 |
| WO | 2013003165 A2 | 1/2013 |

OTHER PUBLICATIONS

Klemettinen et al., "Interactive exploration of interesting findings in the Telecommunication Network Alarm Sequence Analyzer TASA", Information and Software Technology 41, 1999, 11 pages.

Klemettinen et al., "Rule Discovery in Telecommunication Alarm Data", Journal of Network and Systems Management, vol. 7, No. 4, 1999, 29 pages.

De Amo et al., "First-Order Temporal Pattern Mining with Regular Expression Constraints", Data & Knowledge Engineering, vol. 62, 2007, 15 pages.

Zheng et al., "Intelligent Search of Correlated Alarms for GSM Networks with Model-based Constraints", 2002, 8 pages.

Stanton et al., "Alarm-initiated activities: an analysis of alarm handling by operators using text-based alarm systems in supervisory control systems", Ergonomics, vol. 38, No. 11, 1995, 18 pages.

Kvalem et al., "The Simulator-Based Halden Man-Machine Laboratory (HAMMLAB) and Its Application in Human Factor Studies", OECD Halden Reactor Project, Institute for Energy Technology, Norway, 2000, 7 pages.

"Experian Operator's Guide", EP-DSXX44, Release 300, Honeywell International Inc., Jun. 2006, 183 pages.

Gordon et al., "Alarm Presentation System", Westinghouse Electric Company LLC, 2007, 23 pages.

Errington et al., "ASM Consortium Guidelines, Effective Alarm Management Practices", Version 5.02, May 2007, 130 pages.

Bullemer et al., "ASM Consortium Technical Report, Addressing Alarm Flood Situations: Stage 2 Experimental Design", Version 1.02, Jan. 2008, 51 pages.

Bullemer et al., "ASM Consortium Technical Report, Addressing Alarm Flood Situations: Operator Interface Design Considerations", Version 1.00, May 2007, 31 pages.

Bullemer et al., "ASM Consortium Guidelines, Effective Operations Practices", Version 5.00, May 2008, 128 pages.

Brown et al., "Advanced Alarm Systems: Revision of Guidance and Its Technical Basis", Brookhaven National Laboratory, Nov. 2000, 132 pages.

Bristol, "Improved process control alarm operation", ISA Transactions 40, 2001, 15 pages.

Tuszynski et al., "A Pilot Project on Alarm Reduction and Presentation Based on Multilevel Flow Models", Proceedings of the Enlarged Halden Programme Group Meeting, 2002, 12 pages.

"ASM Consortium QRM, Alarm Tread Development Update", Honeywell International Inc., Jun. 2010, 20 pages.

Mannila et al., "Discovery of Frequent Episodes in Event Sequences", Data Mining and Knowledge Discovery 1, 1997, 31 pages.

Haigh et al., "Machine Learning for Alarm System Performance Analysis", ASM Consortium, 2000, 4 pages.

Hollifield et al., "The Alarm Management Handbook, A Comprehensive Guide", 2006, 11 pages.

Colombe et al., "Statistical Profiling and Visualization for Detection of Malicious Insider Attacks on Computer Networks", Proceedings of the 2004 ACM Workshop on Visualization and Data Mining for Computer Security, Oct. 2004, 5 pages.

Frost et al., "Analyzing Alarm and Trend Data", Schneider Electric, Jun. 2008, 11 pages.

Winer, "Vienna Sampler Software: The AWE 64's Well-Kept Secret", Aug. 2015, 8 pages.

Extended European Search Report for European Patent Application No. 12804871.7 dated May 22, 2015, 7 pages.

(56) References Cited

OTHER PUBLICATIONS

Office Action for U.S. Appl. No. 13/170,833 dated Sep. 16, 2014, 28 pages.
Office Action for U.S. Appl. No. 13/170,833 dated Sep. 17, 2015, 30 pages.
International Search Report and Written Opinion of the International Searching Authority for PCT Patent Application No. PCT/US2012/043425 dated Dec. 27, 2012, 9 pages.
Office Action for U.S. Appl. No. 12/634,425 dated Jul. 30, 2015, 27 pages.
Ashley et al., U.S. Appl. No. 13/170,833 entitled "Historical Alarm Analysis Apparatus and Method" filed Jun. 28, 2011, 36 pages.
Stluka et al., U.S. Appl. No. 12/634,425 entitled "Apparatus and Method for Automated Analysis of Alarm Data to Support Alarm Rationalization" filed Dec. 9, 2009, 52 pages.
Arjomandi et al., "Development of an efficient alarm management package for an industrial process plant", 2011 Chinese Control and Decision Conference (CCDC), Aug. 2011, 6 pages.
Eemua, "Alarm Systems: A Guide to Design, Management and Procurement", The Engineering and Materials Users' Association, 2007, 191 pages.
"Management of Alarm Systems for the Process of Industries", Instrumentation, Systems, and Automation Society, ANSI/ISA—18.2—2009, Jun. 2009, 82 pages.
"DynAMo Alarm Suite R100—Advanced Solutions", Honeywell Process Solutions, Nov. 2013, 2 pages.
"DynAMo Metrics & Reporting R120.1 Software Change Notice", Honeywell Process Solutions, Oct. 2015, 16 pages.

* cited by examiner

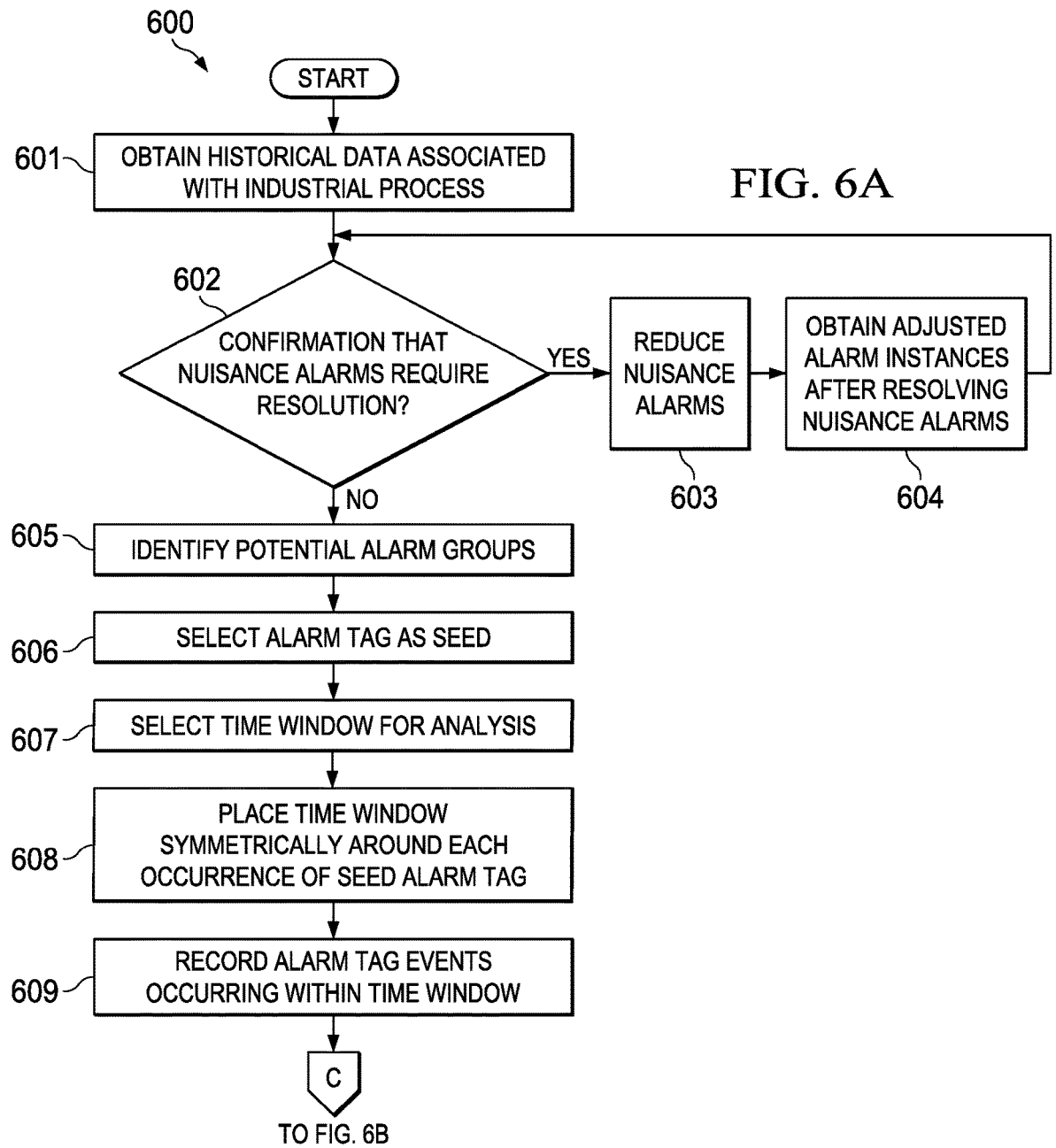

METHODS FOR ANALYTICS-DRIVEN ALARM RATIONALIZATION, ASSESSMENT OF OPERATOR RESPONSE, AND INCIDENT DIAGNOSIS AND RELATED SYSTEMS

TECHNICAL FIELD

This disclosure relates generally to industrial process control and automation systems. More specifically, this disclosure relates to methods for analytics-driven alarm rationalization, assessment of operator response, and incident diagnosis and related systems.

BACKGROUND

Industrial alarm systems are often used to maintain plant safety and meet regulatory requirements. An effective alarm system typically communicates indications of abnormal process conditions or equipment malfunctions to plant operators, personnel monitoring and operating industrial processes, or personnel supporting any required response. However, alarm systems are often designed overcautiously, which can lead to the issuance of too many alarms or the suppression of critical event information. Hence, without careful attention, alarm systems can become more of a liability than an asset over time.

An effective alarm management system may allow operators to focus on alarms that are critical or important, which in turn can improve plant operations, reduce nuisance trips and equipment downtime, increase and sustain process throughput, improve asset availability, and reduce maintenance costs. To this end, standards such as IEC 62682 and ISA18.2 provide guidance for identifying and eliminating nuisance alarms, performing thorough incident reviews, and managing alarm systems.

SUMMARY

This disclosure provides methods for analytics-driven alarm rationalization, assessment of operator response, and incident diagnosis and related systems.

In a first embodiment, a method includes identifying changes in an alarm count for at least one alarm to be generated in an industrial process control and automation system. The changes in the alarm count are based on a plurality of different sets of alarm settings. The method also includes presenting the changes in the alarm count to a user and receiving a selection of one of the sets of alarm settings. The method further includes configuring the industrial process control and automation system with the selected set of alarm settings to enable the industrial process control and automation system to generate the least one alarm using the selected set of alarm settings.

In a second embodiment, a method includes, for each of multiple alarm tags, determining a probability that one of the alarm tags will appear with another of the alarm tags in a group and storing the probabilities for the alarm tags. The method also includes receiving a specified alarm tag and using the specified alarm tag to determine a probability of occurrence of a preceding alarm tag. In addition, the method includes presenting a recommendation to suppress the specified alarm tag in response to the probability of occurrence.

In a third embodiment, a method includes defining a graph representing alarm and event tags associated with an industrial process control and automation system. The graph has the alarm and event tags associated with vertices and probabilities of occurrence associated with edges connecting the vertices. The method also includes identifying a sequence of tags and comparing the sequence of tags with the graph to detect a tag pattern. The method further includes, in response to detecting the tag pattern, presenting pattern information to a user. The pattern information identifies one or more potential causes of the sequence of tags.

In a fourth embodiment, a method includes defining a graph representing alarm and operator action tags associated with an industrial process control and automation system. The graph has the alarm and operator action tags associated with vertices and probabilities of occurrence associated with edges connecting the vertices. The method also includes identifying relationships between the alarms and the operator actions using the graph. The method further includes identifying deviations or discrepancies of the operator responses from one or more allowable responses.

An apparatus having at least one memory and at least one processor and/or a non-transitory computer readable medium containing instructions can also be used to implement each of these methods (individually or in any combination).

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 6A and 6B illustrate an example method for rationalizing groups of alarms according to this disclosure;

DETAILED DESCRIPTION

FIGS. 1 through 13, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Many conventional alarm management systems provide reporting capabilities, such as by identifying alarms or most frequent alarms. However, these systems do not aid in the process of analyzing and resolving the underlying causes of these alarms. For example, conventional systems may provide collated raw data but not the complete information needed by end users to make decisions with respect to alarm management. Instead, conventional management systems often only support a simple reporting mechanism, and repetitive and time-consuming expert analysis is needed to draw conclusions from the limited information that is made available. Moreover, many conventional alarm management systems are not able to analyze the actions of human operators effectively or assess whether an operator response was consistent in terms of action and time to respond for similar conditions or situations. This disclosure provides techniques for overcoming these and other types of problems.

Figure 1:
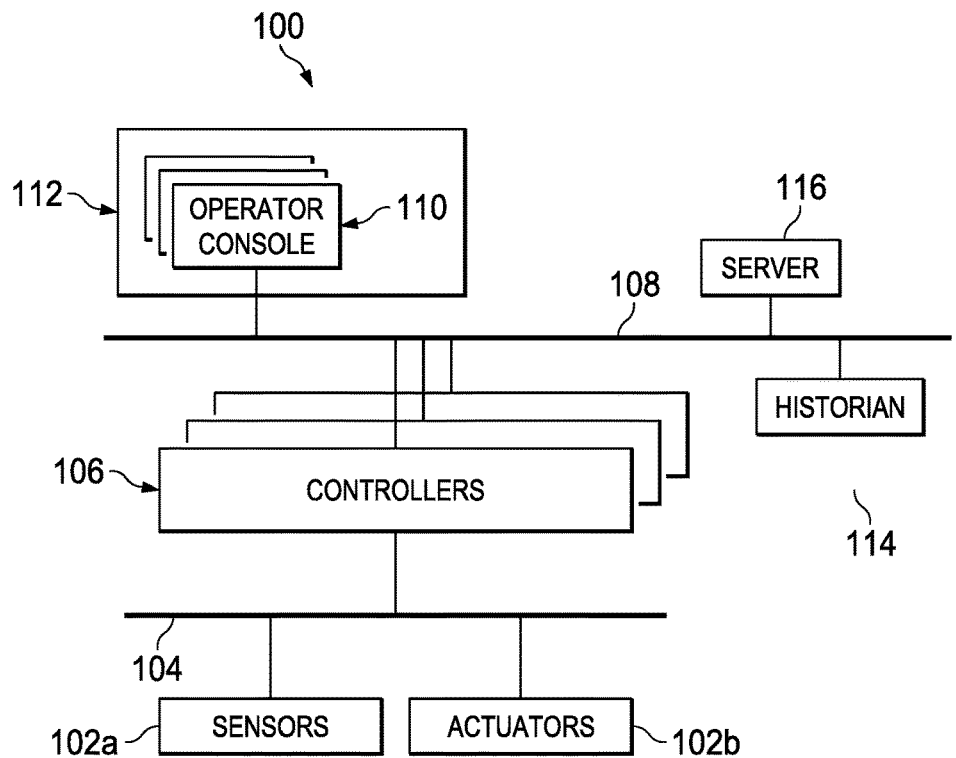
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as pressure, temperature, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control or other advanced predictive control. As a particular example, each controller 106 could represent a computing device running a real-time operating system, a WINDOWS operating system, or other operating system.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and alarms associated with the industrial process. Each operator console 110 could also receive information affecting how the industrial process is controlled, such as by receiving set points or control modes for process variables controlled by the controllers 106 or other information that alters or affects how the controllers 106 control the industrial process. Each operator console 110 includes any suitable structure for displaying information to and interacting with an operator. For instance, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes, such as actual alarms. The historian 114 includes any suitable structure for storing and facilitating retrieval of information. Although shown as a single component here, the historian 114 could be located elsewhere in the system 100, or multiple historians could be distributed in different locations in the system 100. Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system.

Various devices shown in FIG. 1 can generate alarms for users, such as when the controllers 106 generate alarms when values of process variables associated with an industrial process are outside of their respective limits. Industrial processes are typically associated with hundreds or thousands of process variables, which can include controlled, manipulated, and disturbance variables. A controlled variable generally denotes a variable whose value can be measured or inferred and that is controlled to be at or near a desired set point or within a desired range. A manipulated variable generally denotes a variable that can be altered in order to adjust one or more controlled variables. A disturbance variable generally denotes a variable whose value can be considered but not controlled when determining how to adjust one or more manipulated variables to achieve desired changes to one or more controlled variables.

As described in more detail below, one or more of the components in FIG. 1 (such as the operator consoles 110 or the server 116) provide an alarm management tool that can be used to apply data analytics and workflow to support alarm rationalization and resolution. Among other things, the alarm management tool enables faster root cause analysis, as well as assessment and evaluation of operator responses. Faster root cause analyses can be achieved by examining "what-if" scenarios and performing pattern searching for single alarm/event tags and for multiple alarm/event tags. As a particular example, the alarm management tool can be used to identify nuisance and related alarms (such as duplicate alarms, consequential alarms, and alarm groups), provide suggestions to resolve them, enable simplified workflows to apply the suggestions, and enable the resolution of issues. As another particular example, the alarm management tool can be used to assess and evaluate if an operator's response was timely, proper, or missing. As yet another particular example, the alarm management tool can be used for investigating periods containing alarm floods or plant upsets. This could be achieved by identifying if similar events or alarm patterns were present during a flood or plant upset period and checking if the flood or plant upset was a result of a group of alarms, such as alarms caused by the failure of a single device or a system having multiple devices (like during a trip or shutdown).

Although FIG. 1 illustrates one example of an industrial process control and automation system 100, various changes may be made to FIG. 1. For example, the system 100 could include any number of sensors, actuators, controllers, networks, operator stations, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where alarm management can be used to support alarm rationalization and resolution. This functionality can be used in any other suitable system.

Figure 2:
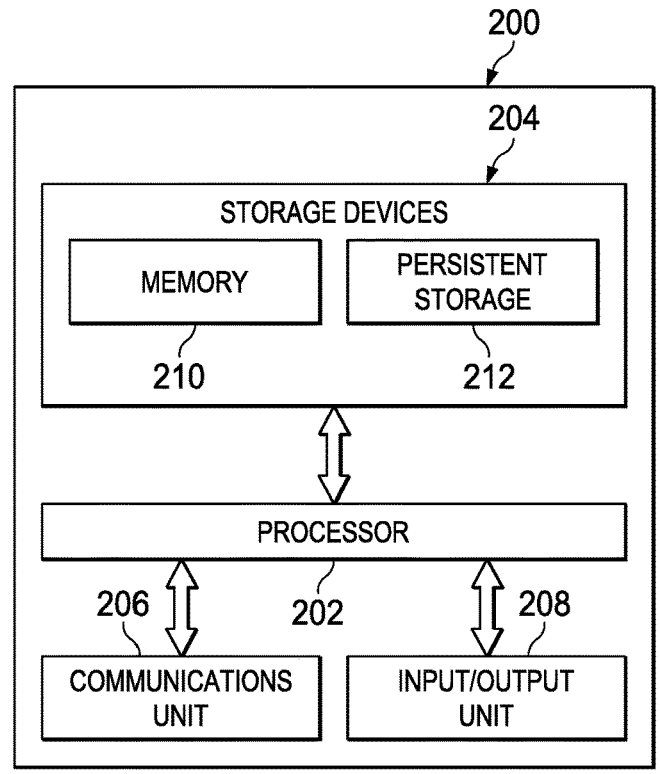
FIG. 2 illustrates an example device supporting rationalization and resolution of alarms in an industrial process control and automation system according to this disclosure.

FIG. 2 illustrates an example device 200 supporting rationalization and resolution of alarms in an industrial process control and automation system according to this disclosure. For ease of explanation, the device 200 may be described as being used in the system 100 of FIG. 1. The device 200 could, for example, denote an operator console 110 or a server 116 in FIG. 1. However, the device 200 could be used in any other suitable system.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. The instructions could implement the alarm management functionality described in this patent document. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include a network interface card or a wireless transceiver facilitating communications over a wired or wireless network (such as the network 108). The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 supporting rationalization and resolution of alarms in an industrial process control and automation system, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
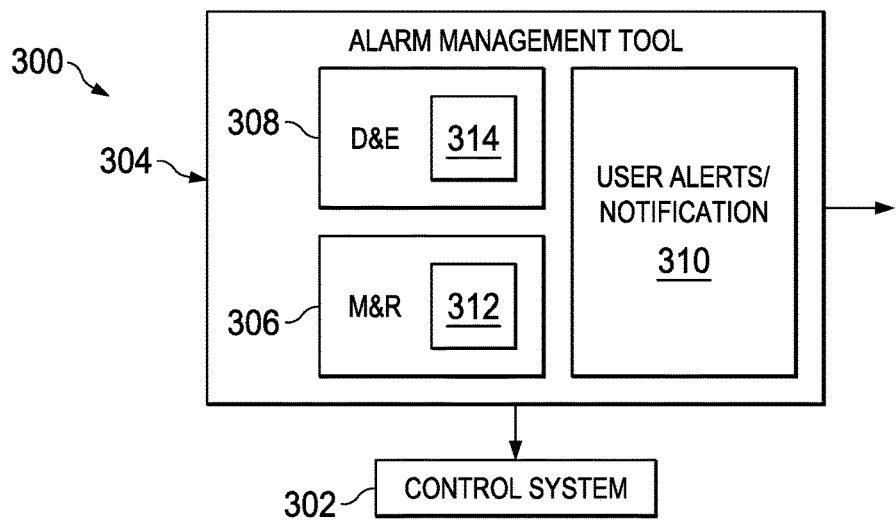
FIG. 3 illustrates an example functional architecture supporting rationalization and resolution of alarms in an industrial process control and automation system according to this disclosure.

FIG. 3 illustrates an example functional architecture 300 supporting rationalization and resolution of alarms in an industrial process control and automation system according to this disclosure. For ease of explanation, the architecture 300 may be described as being implemented using the device 200 of FIG. 2 in the system 100 of FIG. 1. The architecture 300 could, for example, be supported by an operator console 110 or a server 116 in FIG. 1. However, the architecture 300 could be used by any other suitable device and in any other suitable system.

As shown in FIG. 3, the architecture 300 includes or is used in conjunction with a control system 302, which could denote the system 100 of FIG. 1 or other process control and automation system. The architecture 300 includes an alarm management tool 304, which generally denotes a software tool or other logic that is used to manage alarms that are generated in the control system 302. For example, the alarm management tool 304 could allow users to define the properties of alarms, such as the condition(s) to be met for an alarm to be generated, the priority of the alarm when generated, and the recipient(s) of an alarm. The alarm management tool 304 can be used by users to develop an effective alarm strategy to improve safety, availability, or profitability in the control system 302. The alarm management tool 304 includes any suitable logic for collecting, storing, managing, and reporting alarms generated in a control system and related information (such as related events and operator actions). The alarm management tool 304 could, for instance, denote the DYNAMO software suite from HONEYWELL INTERNATIONAL INC.

In this particular example, the alarm management tool 304 includes various functions 306-310 that support different operations of the alarm management tool 304. A metrics and reporting (M&R) function 306 is used to collect alarm and event data from various data sources in the control system 302 and to present this information to users. Reports can be generated using this information, and the reports can be used to gain insight into a facility's performance and issues in its alarm systems. The M&R function 306 can also be used to visually compare alarm metrics against industry standards and identify deviations. Among other things, the M&R function 306 can be used to help reduce or eliminate nuisance alarms, ensure compliance, and improve analysis of alarms and events.

A documentation and enforcement (D&E) function 308 is used to help drive and sustain improvements in alarm management. For example, the D&E function 308 can be used to capture documentation, configuration, and rationalization data for alarms. This information can be used to help maintain engineered configurations over the lifecycle of equipment in the control system 302. This information can also be used to ensure that alarms are consistent with operating conditions of a facility.

A user alert/notification function 310 is used to generate alerts or other notifications for users, possibly before alarms are triggered in the control system 302. This may allow, for example, users to define notifications that can help improve situational awareness over an industrial process without adding unnecessary alarms to the actual control system 302. Near-real time alerts and other notifications could be generated to identify when process data is outside of specified limits, which can provide an early indication of a problem before an alarm is justified.

A knowledge model 312 is used by the M&R function 306 to store various information used by the alarm management tool 304. The information stored by the knowledge model 312 could vary as needed or desired. For example, the information stored by the knowledge model 312 could include details such as alarm tag relationships, relationships between alarms and operator actions, settings of the alarm management tool 304, and any other suitable information. The knowledge model 312 could be stored in a persistent memory (such as the persistent storage 212).

An analytics engine 314 is used by the D&E function 308 to process data collected by the alarm management tool 304 and generate analytics related to the data. The analytics generated by the analytics engine 314 could include any suitable values, such as those described below. The analytics engine 314 could include any suitable logic for analyzing data.

Although FIG. 3 illustrates one example of a functional architecture 300 supporting rationalization and resolution of alarms in an industrial process control and automation system, various changes may be made to FIG. 3. For example, components could be added, omitted, combined, further subdivided, or placed in any other suitable configuration according to particular needs. As a particular example, each of the functions 306-310 could be divided into multiple sub-functions.

The following discussion describes functions that can be performed by the alarm management tool 304 to analyze data and support alarm rationalization and resolution within an industrial process control and automation system, such as the system 100. The alarm management tool 304 supports data analytics and workflow that are applied to the task of alarm management in order to enable faster root cause analysis to resolve related and nuisance alarms. These functions can involve data stored in the knowledge model 312 and processing performed by the analytics engine 314. In the following discussion, the methods are described as being performed by the alarm management tool 304 of FIG. 3 executing on the device 200 of FIG. 2 in the system 100 of FIG. 1. However, these functions could be used by any other suitable device and in any other suitable system.

Figure 4A:
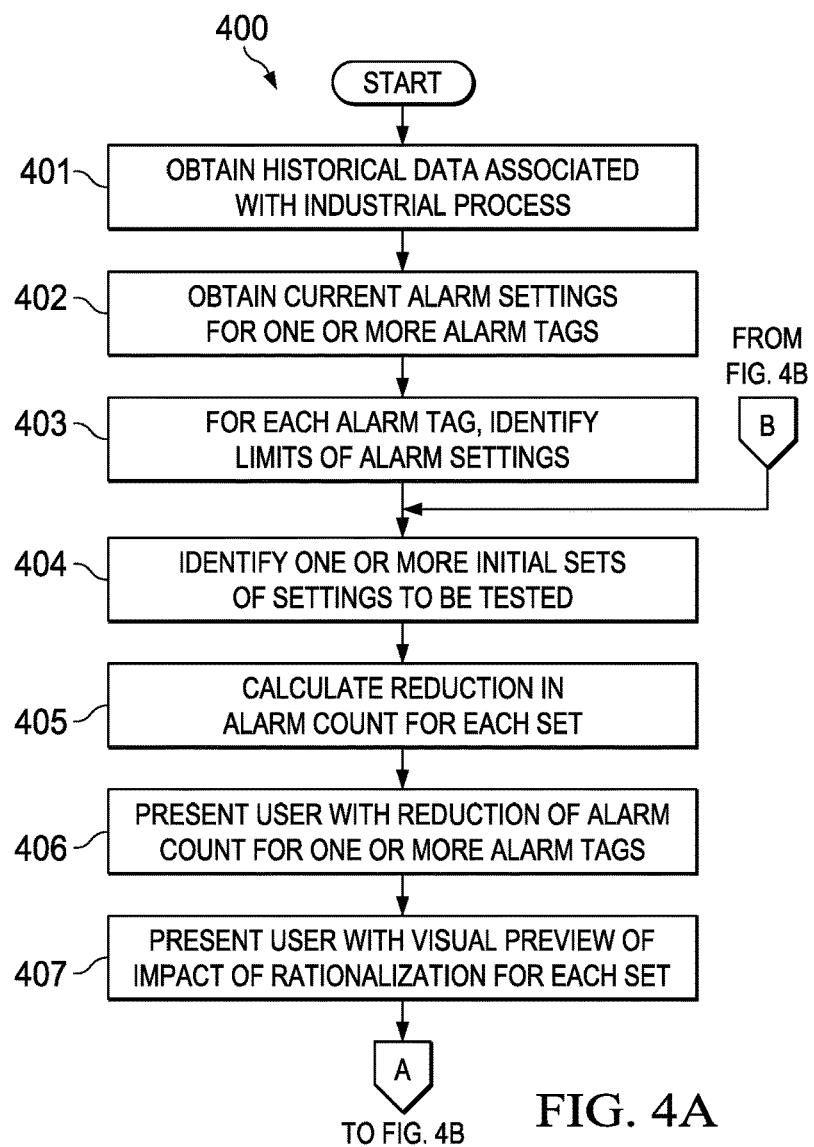
FIGS. 4A and 4B illustrate an example method for rationalizing nuisance alarms (such as chattering and fleeting alarms) according to this disclosure.
Figure 4B:
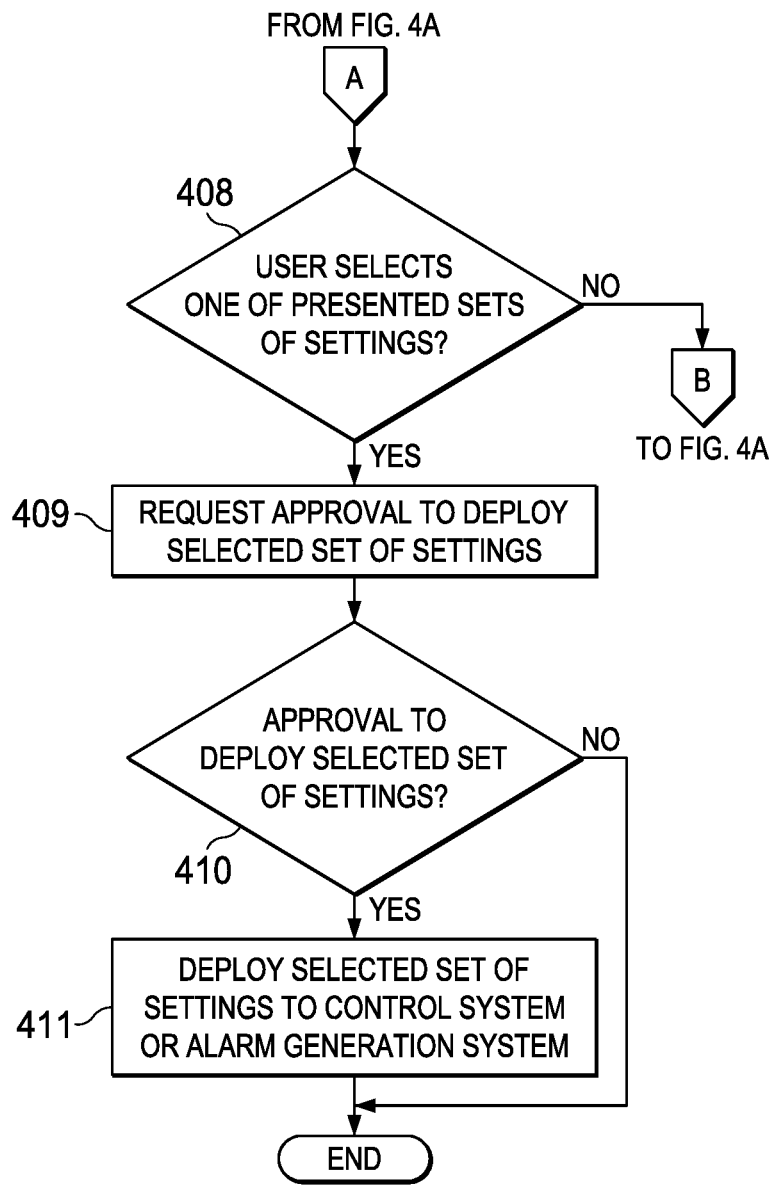

FIGS. 4A and 4B illustrate an example method 400 for rationalizing nuisance alarms (such as chattering and fleeting alarms) according to this disclosure. In the following description, "nuisance alarms" include "chattering alarms" and "fleeting alarms." A "chattering alarm" is generally an alarm that repeatedly transitions between active and inactive alarm states within a short period of time. A "fleeting alarm" is generally an alarm that transitions between active and inactive alarm states within a short period of time. Depending on the implementation, the method 400 may be applied one alarm tag at a time or to multiple alarm tags at once, such as to all alarm tags generated at a given plant, operator position, or area.

Historical data associated with an industrial process is obtained for a single alarm tag or multiple alarms tags at step 401. This could include, for example, the processor 202 retrieving historical data from the historian 114 or other source(s). The historical data could relate to a plant, a unit or other area of the plant, or other group of assets implementing one or more industrial processes. The historical data could also relate to a portion of a plant being managed by a particular operator or a group of operators.

Current alarm settings are obtained for one or more alarm tags at step 402. This could include, for example, the processor 202 retrieving the alarm settings from the control system 302 or from data stored by the alarm management tool 304. The alarm settings could include settings such as a timer on delay, a timer off delay, and a dead band for an alarm. At least some of the alarm settings are typically used by a system to require that a certain state be maintained for a period of time before an action (such as alarm generation) occurs.

For each alarm tag, limits of the alarm settings are identified at step 403. This could include, for example, the processor 202 identifying the limits of the alarm settings based on information taken from the knowledge model 312 for one or more alarm tags. As a particular example, the allowable limits on the timer on delays, timer off delays, and dead bands may vary based on the criticality of the individual alarms. For highly-critical alarms, the timer on delay setting may be turned off or set to a very low value so that an alarm annunciation is not delayed. Higher values for the timer off delay settings may be allowed for critical alarms. Similarly, based on process measurements like flow rate, material level, or temperature, different limits on the dead band and timer off delay settings may be set. The knowledge model 312 could be used to provide the limits (typically expressed as range, minimum, and maximum values) for the different alarm setting values.

One or more initial sets of alarm settings to be tested are identified at step 404. This could include, for example, the processor 202 identifying one or more initial sets of alarm settings for one or more alarm tags from the knowledge model 312. As a particular example, seed values of alarm settings could be obtained from typical range limits for the alarms stored in the knowledge model 312.

A reduction in alarm count for each of the sets of alarm settings is calculated at step 405. This could include, for example, the processor 202 using a decision tree rule structure that is constructed based on domain knowledge. The decision tree rule structure could be generated using techniques that include data contextualization, data ingestion (transformation and enrichment), distributed storage and processing, and data classification and clustering.

As a particular example, assume that a data table includes rows containing alarms in the sequence in which the alarms were issued. Also assume that there is more than one row in the table, since these operations are not needed if a single alarm is present. Using the values for the timer on and timer off delays from the prior step, the alarms are analyzed row-by-row. Denote the current row being examined as the $j^{th}$ row. For the $j^{th}$ row, calculate the duration of the alarm and the time between this alarm and the alarm in the $(j+1)^{th}$ row. If the calculated duration of the alarm is less than the corresponding timer on delay, the alarm is a fleeting alarm, and the $j^{th}$ row is deleted. If the calculated time between the alarms is less than the corresponding timer off delay, the alarm is a chattering alarm, the ending time of the alarm in the $j^{th}$ row is set equal to the ending time of the alarm in the $(j+1)^{th}$ row, and the $(j+1)^{th}$ row is deleted. The time between the alarm in the $j^{th}$ row and the new alarm in the new $(j+1)^{th}$ row can be determined, and the ending time of the new alarm in the new $(j+1)^{th}$ row could be transferred to the $j^{th}$ row and the $(j+1)^{th}$ row could be deleted if needed. This can continue until there is no indication that the alarms in the $j^{th}$ row and the $(j+1)^{th}$ row are chattering alarms. Once the processing of the $j^{th}$ row is completed, the same process could be repeated for each subsequent row until the whole table has been processed.

The reduction of alarm count for one or more alarm tags resulting from the one or more sets of settings is presented to a user at step 406. This could include, for example, the processor 202 generating and presenting a decision matrix that identifies each set of settings and the alarm reduction for each set. The decision matrix can assist the user in selecting the desired settings (such as desired timer on delay, timer off delay, and dead band) from those presented based upon a consideration of various factors, such as alarm criticality/severity. The user is presented with a visual preview of the impact of rationalization for each set of settings at step 407. The visual preview demonstrates the reduction of the alarm count for one or more of the alarm tags based on the associated set of settings. The alarm preview enables the user to visually differentiate between alarm occurrence rates with the current settings and with one or more proposed sets of settings. In some embodiments, time-series analysis of the alarm occurrence rates, levels, trends, and seasonality of the alarm tags are calculated and used for visualization as an aid to confirm the desired alarm settings.

A determination is made whether the user selects one of the proposed sets of settings at step 408. If not, the method 400 returns to step 404 for the selection of one or more other sets of settings. This may allow, for example, the user to engage in "what-if" analysis by selecting different settings and repeating the analysis. Otherwise, if the user selects one of the proposed sets of settings, the user requests approval to deploy the selected set of alarm settings at step 409. This could include, for example, the processor 202 initiating a message indicating that approval is needed from a supervisor or other personnel. If approved at step 410, the selected set of alarm settings is deployed at step 411. This could include, for example, the processor 202 pushing the set of alarm settings to a control system or an alarm generation system.

Figure 5:
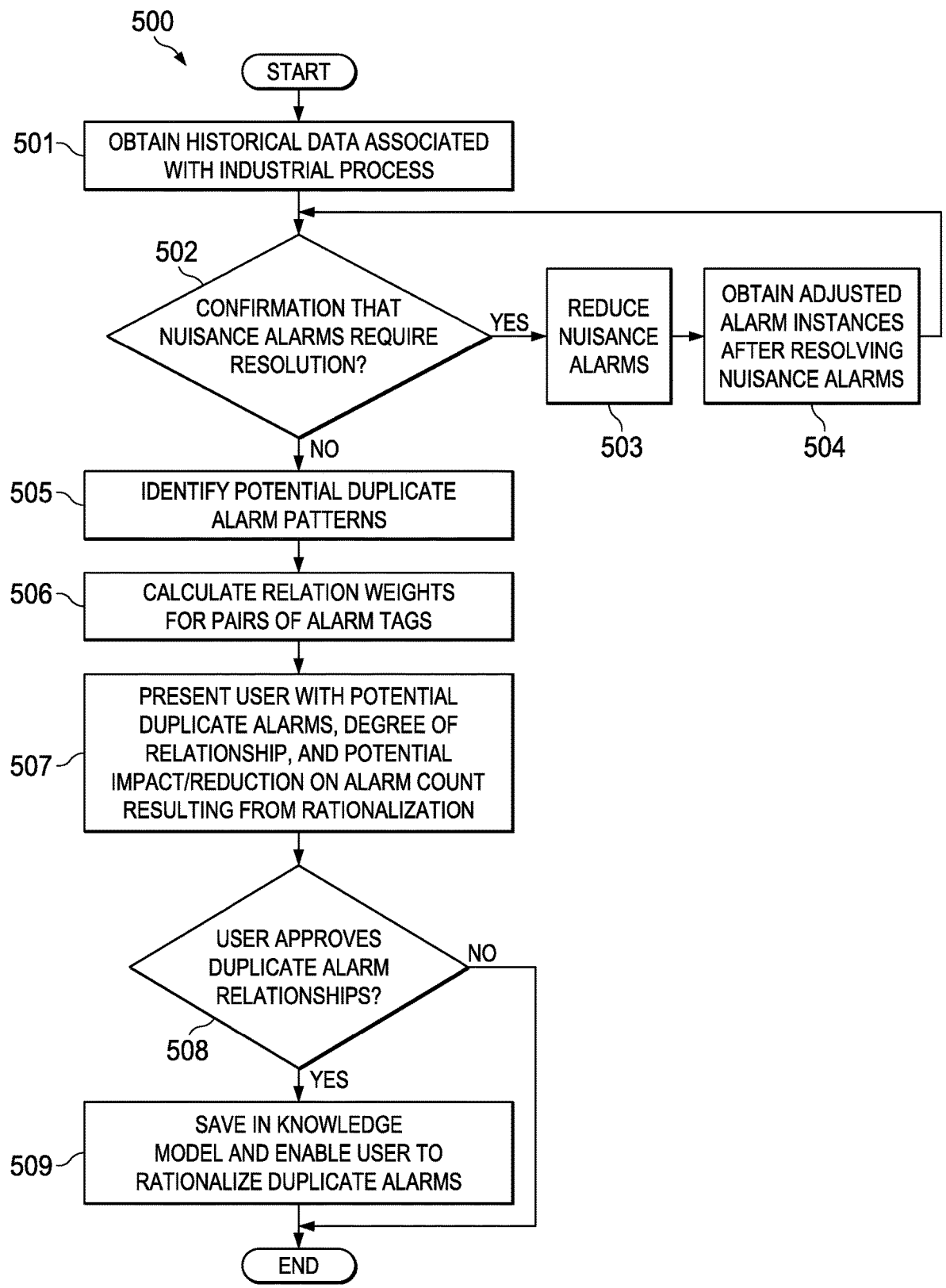
FIG. 5 illustrates an example method for rationalizing duplicate alarms according to this disclosure.

FIG. 5 illustrates an example method 500 for rationalizing duplicate alarms according to this disclosure. Duplicate alarms generally represent different alarms that indicate the same abnormal situation. For example, if two or more alarms share the same measurement source and all of the alarms are triggered as having a "bad measurement," it is likely that a failure of the measurement source is the cause of the alarms. Duplicate alarms that are identified can be rationalized in various ways, such as by eliminating or suppressing one or more of the alarms or by converting one or more of the alarms into non-annunciated alarms.

Historical data associated with an industrial process is obtained at step 501. This could include, for example, the processor 202 retrieving information identifying alarms, events, operator actions, and operating conditions from the historian 114 or other source(s). The historical data could relate to a plant, a unit or other area of the plant, or other group of assets implementing one or more industrial processes. The historical data could also relate to a portion of a plant being managed by a particular operator or a group of operators.

Confirmation is obtained from a user whether nuisance alarms (such as chattering or fleeting alarms) in the historical data need to be resolved at step 502. This could include, for example, presenting at least some of the historical data to the user for review. If the user confirms that nuisance alarms need to be resolved, the alarms are reduced at step 503. This could include, for example, the processor 202 performing the method 400 of FIGS. 4A and 4B to identify a set of alarm settings that are selected by the user and that reduce the number of nuisance alarms. If the user elects not to resolve nuisance alarms, the process skips to step 505.

The adjusted alarm instances that occur based on the selected set of settings are obtained at step 504. This could include, for example, the processor 202 identifying the alarms that would have been generated based on the selected set of alarm settings. Potential patterns of duplicate alarms are identified at step 505. This could include, for example, the processor 202 using data analytics to identify potential duplicate alarm patterns.

Figures 12, 13:
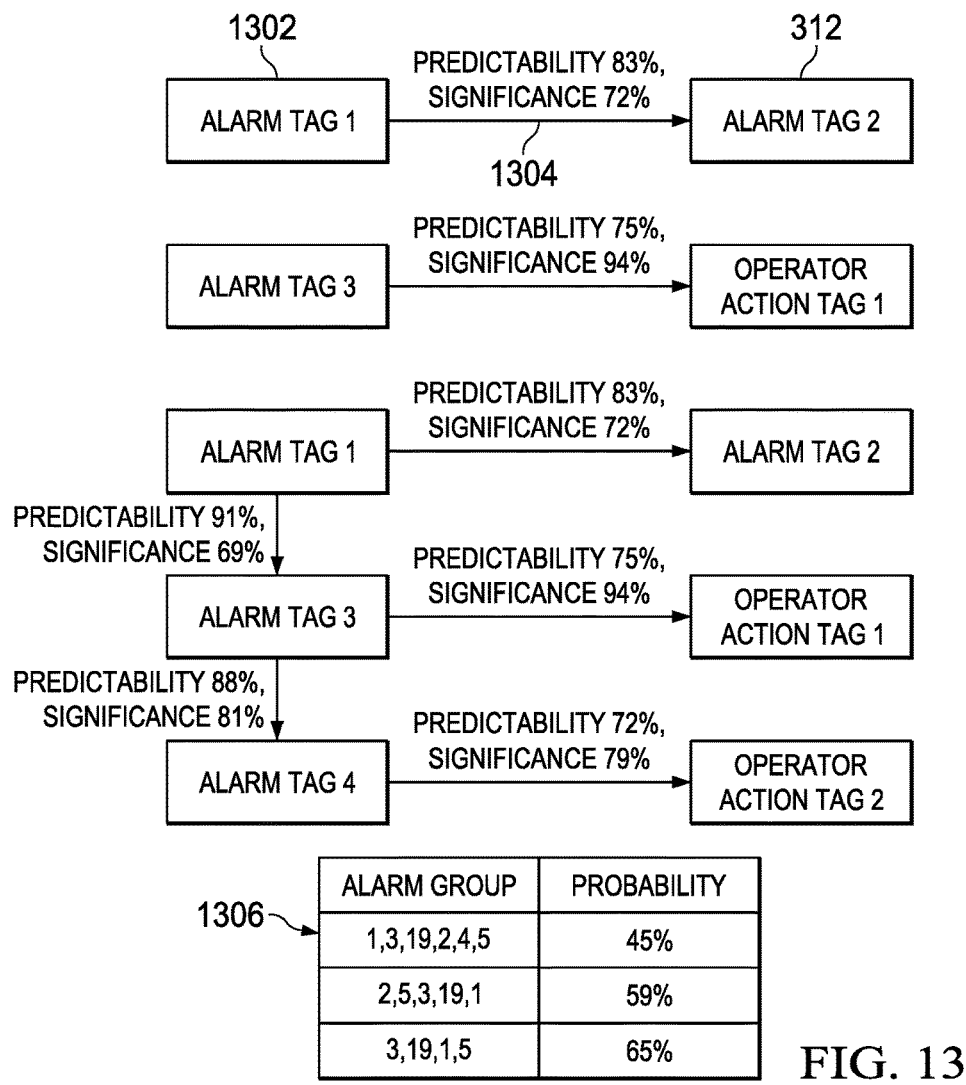
FIG. 12 illustrates an example decision matrix that can be presented to a user according to this disclosure.
FIG. 13 illustrates example contents of a knowledge model supporting rationalization and resolution of alarms according to this disclosure.

Relation weights are calculated for pairs of alarm tags at step 506. This could include, for example, the processor 202 generating weights for all pairs of alarm tags within a given context, such as a given time period and plant location. Relation weights identify the predictability (or probability) of a second alarm event occurring after a previous alarm event, and the significance (or probability) of an alarm event always preceding the second alarm event. Predictability can be calculated as the probability that, if a first alarm event occurs, a second alarm event will follow immediately (within a specified time window). Significance can be calculated as the probability to infer that, when the second alarm event occurs, the previous alarm event has occurred recently (within a specified time window). The calculated values for predictability and significance can both be high when calculated for alarm pairs that are duplicate alarms. In some embodiments, the calculated values are organized and stored in a graph structure, where alarm tags are the vertices and the probabilities of occurrence are the weights on the edges. This graph structure can be maintained over time, such as in the knowledge model 312. Example graph structures are shown in FIG. 13, which is described below.

The results are presented to the user at step 507. This could include, for example, the processor 202 generating a graphical display presenting a list of potential duplicate alarms along with the degree of the relationship and potential impact/reduction on alarm count resulting from rationalization (suppression of duplicate alarms). This information could be presented to the user as a list, where the user could select and approve the appropriate duplicate alarm relationships.

The user is allowed to approve duplicate alarm relationships at step 508. This could include, for example, the processor 202 querying whether the user agrees that identified potential duplicate alarms actually are duplicate alarms. The user could identify those identified potential duplicate alarms that appear correct or incorrect. Any approved alarm relationships can be saved and persisted, and the user is enabled to rationalize duplicate alarms at step 509. This could include, for example, the processor 202 storing alarm relationships identified as correct by the user, such as in the knowledge model 312. This could also include the processor 202 applying the approved duplicate alarm patterns to reduce alarms. As particular examples, the second alarm in a duplicate pattern could be converted into a non-annunciated alarm (alert/event) or eliminated in the control system 302, or suppression by design could be applied in an event source system going through a management of change process.

Figure 6B:
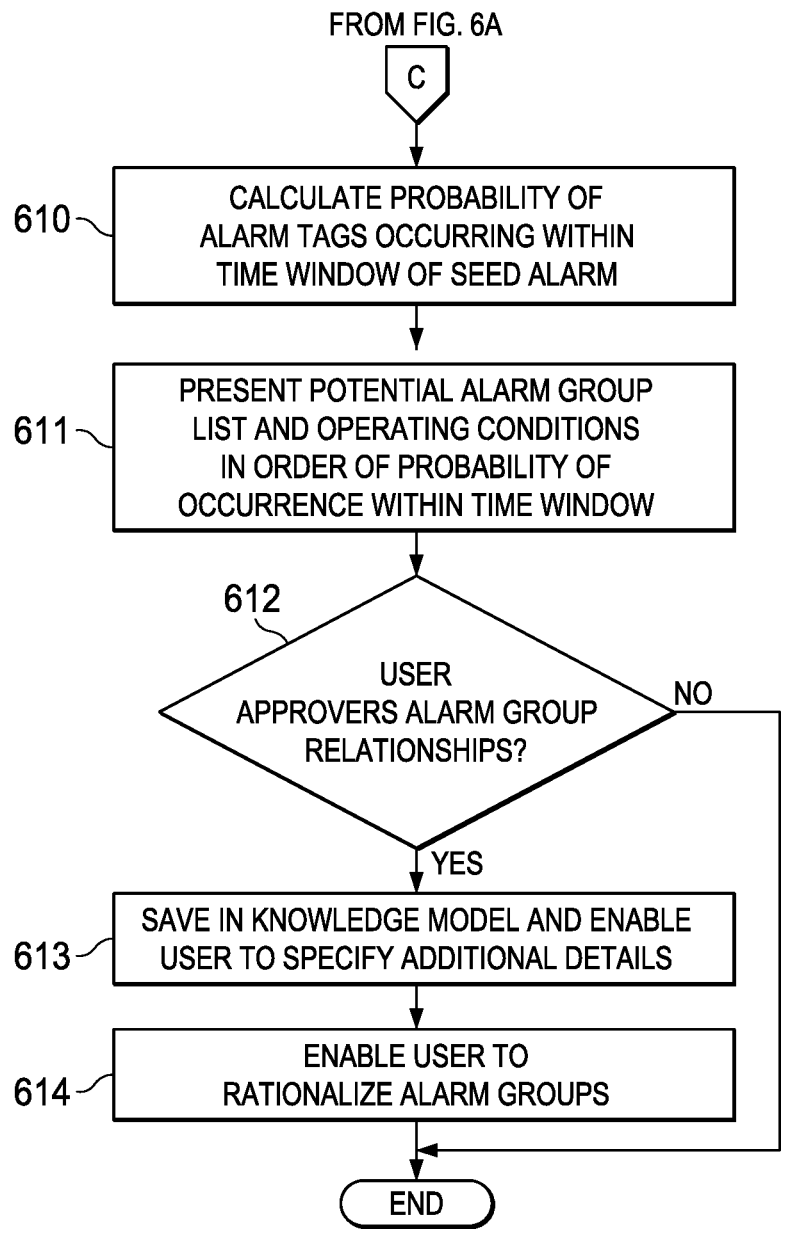

FIGS. 6A and 6B illustrate an example method 600 for rationalizing groups of alarms according to this disclosure. Generally, alarm groups include multiple alarms, which could be triggered in scenarios such as an industrial equipment trip or shutdown. Also, an event involving an industrial unit having multiple pieces of interlinked industrial equipment can cause a cascade of alarms. For example, a compressor unit trip may generate various alarms related to compressor parameters like pressure, temperature, flow, motor speed, and motor current, resulting in multiple alarms. However, the sequence of alarm tag activations for a particular alarm group may not be identical for all instantiations of that group. An example technique for rationalizing a group of alarms is first-out alarming, which refers to determining when an alarm is the first alarm in a multiple-alarm scenario. Using this technique, the first occurring alarm in an alarm group could be permitted to annunciate, while the rest of the alarms can be suppressed.

Steps 601-604 may be the same as or similar to steps 501-504 discussed above, and the process could skip to step 605 if the user elects not to resolve nuisance alarms. Potential groups of alarms are identified at step 605. This could include, for example, the processor 202 using data analytics to identify groups of alarms that appear together in the data. An alarm tag is selected as a seed alarm tag at step 606. This could include, for example, the processor 202 selecting the seed alarm tag based on user input, tag criticality, or data stored in the knowledge model 312. A time window is selected for analysis at step 607. This could include, for example, the processor 202 selecting the time window based on user input or data stored in the knowledge model 312. The time window is placed symmetrically around each occurrence of the seed alarm tag in the historical data at step 608, and all alarm tag events occurring within the time windows are recorded for the time windows at step 609.

The probability of each alarm tag occurring within the time windows of the seed alarm tag is calculated at step 610. This could include, for example, the processor 202 calculating the probability for each alarm tag based on the number of time windows where each alarm tag appears and the total number of time windows. In some embodiments, alarm tags can be considered individually and in sets of two, three, four, and so on until a maximum alarm tag count in any time window is reached.

A list of potential alarm groups is presented to the user at step 611. This could include, for example, the processor 202 generating a graphical display presenting a list of potential alarm groups along with operating conditions in order of probability of occurrence within a time window. This information could be presented to the user as a list, where the user could select and approve the appropriate alarm group relationships.

The user is allowed to approve alarm group relationships at step 612. This could include, for example, the processor 202 querying whether the user agrees that identified potential alarm groups actually are groups of alarms. The user could identify those identified alarm groups that appear correct or incorrect. Any approved alarm group relationships (along with details like seed alarm tags and operating conditions) are saved and persisted, and the user can specify additional details for the approved alarm groups at step 613. This could include, for example, the processor 202 storing alarm group relationships identified as correct by the user, such as in the knowledge model 312. This could also include the processor 202 receiving information like typical causes, resolutions, and consequences from the user and storing that information in the knowledge model 312. The user is enabled to rationalize alarm groups at step 614. This could include, for example, the processor 202 applying the approved alarm group patterns to reduce alarms. For instance, a first-out alarming technique for the alarm group can be configured in an event source going through a management of change process.

Figure 7:
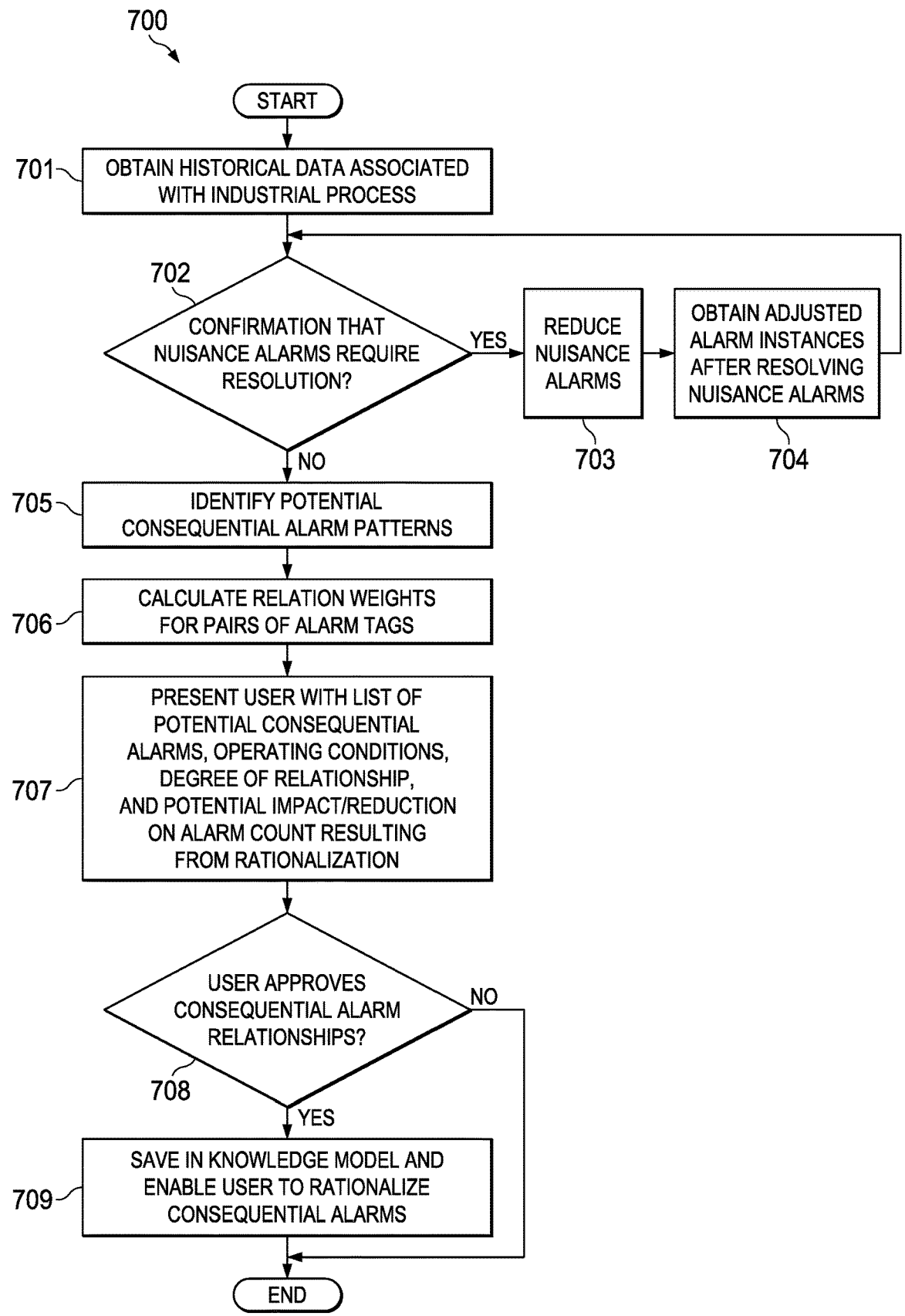
FIG. 7 illustrates an example method for rationalizing consequential alarms according to this disclosure.

FIG. 7 illustrates an example method 700 for rationalizing consequential alarms according to this disclosure. Here, two consequential alarms can be rationalized using suppression by design (based on operating condition) techniques or other techniques. Generally, consequential alarms are related alarms where a single alarm related to a piece of industrial equipment may trigger other alarms downstream in an industrial process. For example, a pump trip alarm may result in low pressure or low feed alarms in downstream equipment.

Steps 701-704 may be the same as or similar to steps 501-504 discussed above, and the process could skip to step 705 if the user elects not to resolve nuisance alarms. Potential patterns of consequential alarms are identified at step 705. This could include, for example, the processor 202 using data analytics to identify alarm patterns where one alarm appears to be the cause of a subsequent alarm. Relation weights are calculated at step 706, such as for all pairs of alarm tags within a context like a time period and a plant location. As noted above, relation weights can include calculated values for predictability and significance.

A list of potential consequential alarms is presented to the user at step 707. This could include, for example, the processor 202 generating a graphical display presenting a list of potential consequential alarms along with a degree of the relationship, operating conditions, and potential impact/reduction of the alarm count that will result from rationalization. This information could be presented to the user as a list, where the user could select and approve the appropriate consequential alarm relationships.

The user is allowed to approve consequential alarm relationships at step 708. If so, the approved consequential alarm relationships (along with details such as operating conditions) are stored, and the user is enabled to rationalize consequential alarms at step 709. This could include, for example, the processor 202 storing information about the approved consequential alarm relationships in the knowledge model 312. This could also include the processor 202 applying the approved consequential alarm patterns to reduce alarms, such as by applying suppression by design techniques (based on operating condition) in an event source system going through a management of change process.

Note that while the methods 500-700 here allow a user to identify how alarm rationalization can occur for duplicate alarms, groups of alarms, and consequential alarms, the functionality of the alarm management tool 304 can be used in other ways to support other functions. For example, processes for evaluating the relationships between alarms and required operator responses allow users to evaluate and assess the effectiveness of operator responses, such as whether particular personnel issued proper responses in a timely manner.

Figure 8:
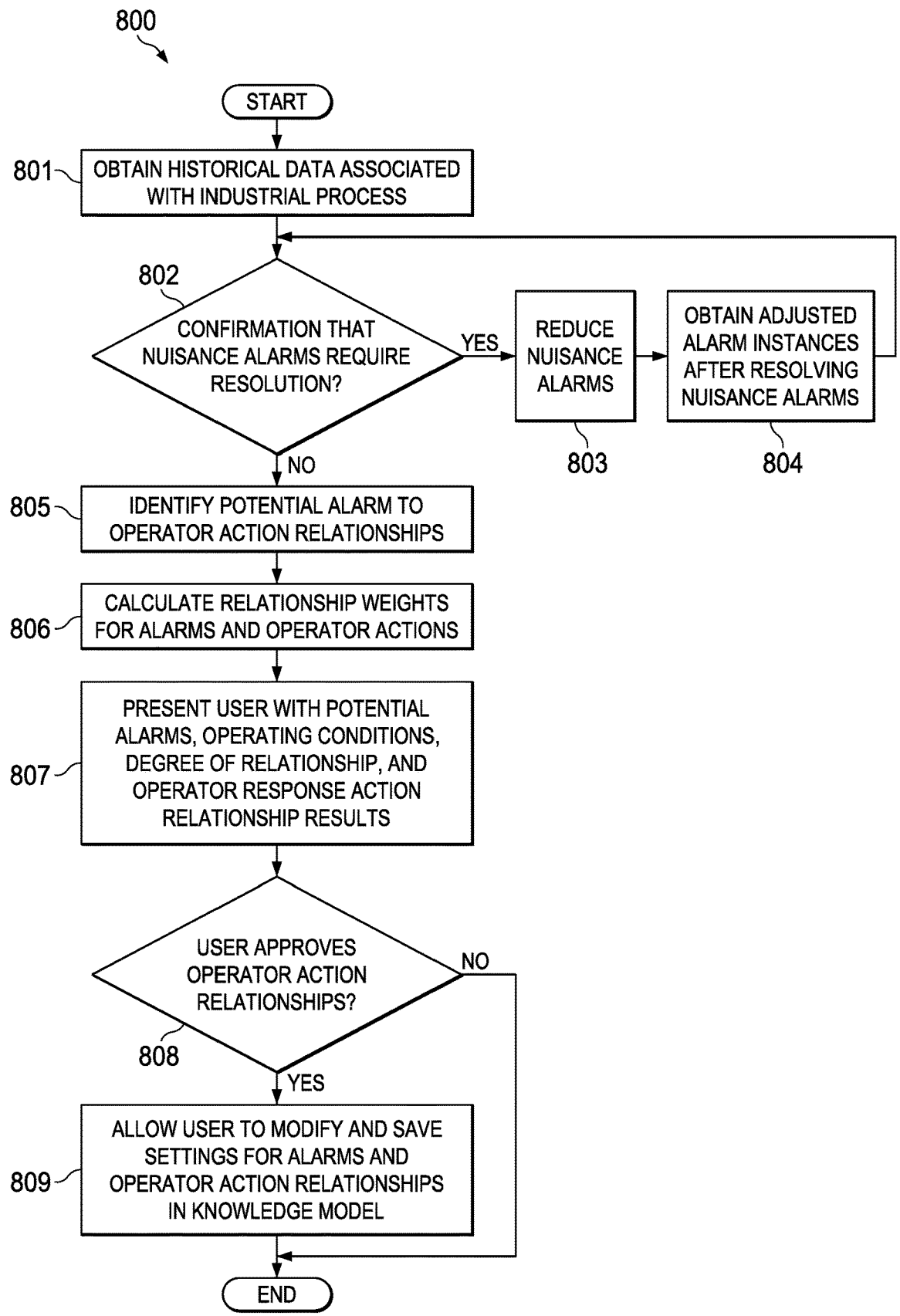
FIG. 8 illustrates an example method for identifying alarm-to-operator action relationships to aid in assessing operator responses according to this disclosure.

FIG. 8 illustrates an example method 800 for identifying alarm-to-operator action relationships to aid in assessing operator responses according to this disclosure. Steps 801-804 may be the same as or similar to steps 501-504 discussed above, and the process could skip to step 805 if the user elects not to resolve nuisance alarms.

Potential relationships between alarms and operator actions are identified at step 805. This could include, for example, the processor 202 using data analytics to identify potential alarm to operator action relationships, with rankings based on the degree of relationship. Relation weights are calculated for the alarm and operator action relationships at step 806, such as within a given context (like a given time period and plant location). Here, predictability can be calculated as the probability that, if an alarm event occurs, an operator action event will follow immediately (within a specified time window). Significance can be calculated as the probability that, when the operator action event occurs, the previous alarm event has occurred recently (within a specified time window). In some embodiments, the calculated values are organized and stored in a graph structure, such as when operator actions occurring after alarm events are integrated as vertices into the graph and the probability of occurrence and the time period between the alarm and the operator action are stored as weights on the edges.

A list of potential alarm and operator action relationships is presented to the user at step 807. This could include, for example, the processor 202 generating a graphical display presenting a list of potential alarm and operator action relationships, along with the degrees of relationship (such as in the form of relation weights), operating conditions, and response times. This information could be presented to the user as a list, where the user could select and approve the appropriate alarm to operator action relationships.

The user may approve alarm and operator action relationships at step 808. If so, the approved alarm and operator action relationships are saved, and the user may modify and save settings at step 809. This could include, for example, the processor 202 storing information about the approved alarm and operator action relationships in the knowledge model 312. This could also include the processor 202 receiving changes to allowable response times, magnitudes of response limits, magnitudes of violation limits, and operating conditions for the alarm and operator action relationships. These values can be stored in the knowledge model 312.

Figure 9A:
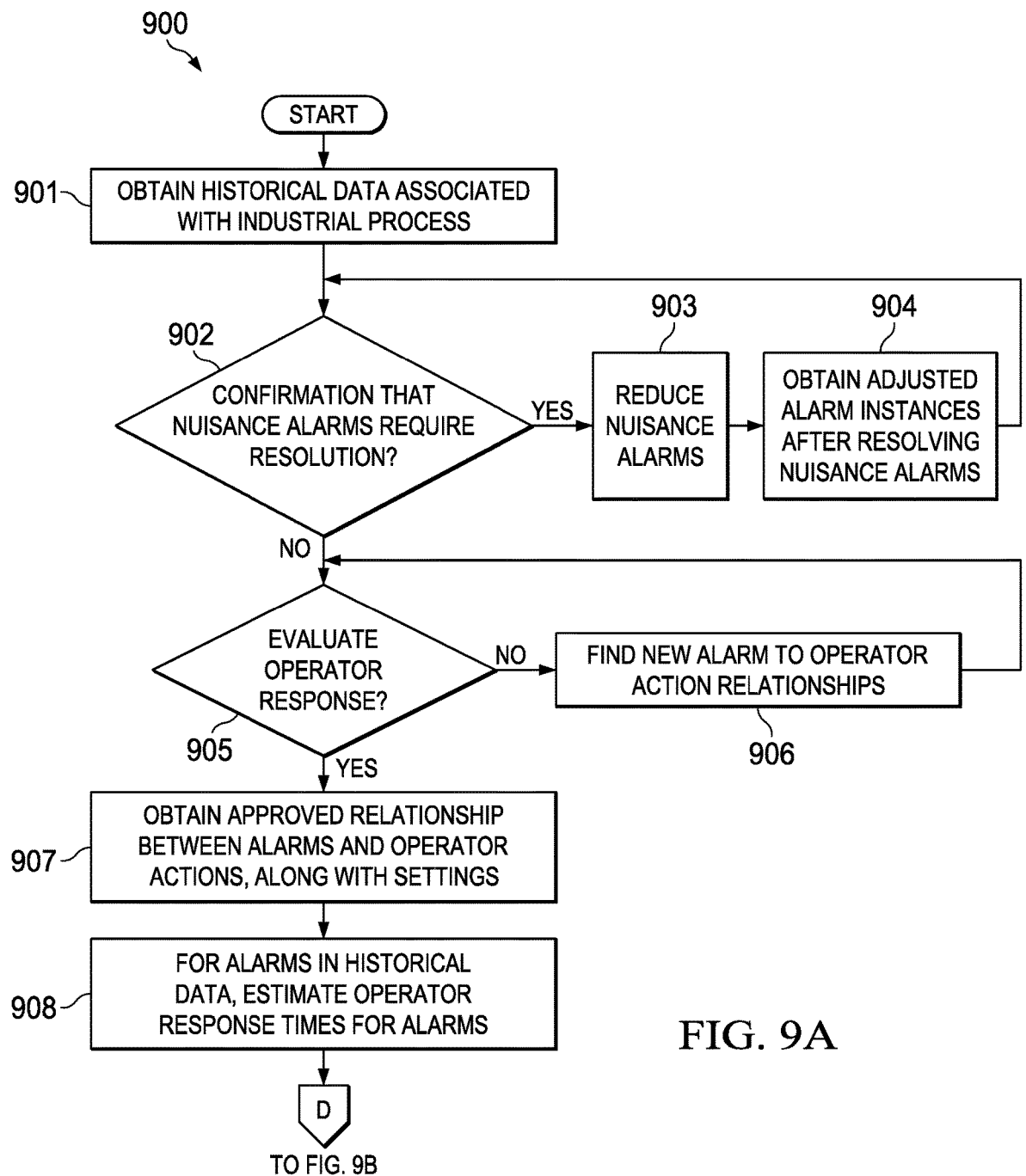
FIGS. 9A and 9B illustrate an example method for assessing and evaluating operator responses according to this disclosure.
Figure 9B:
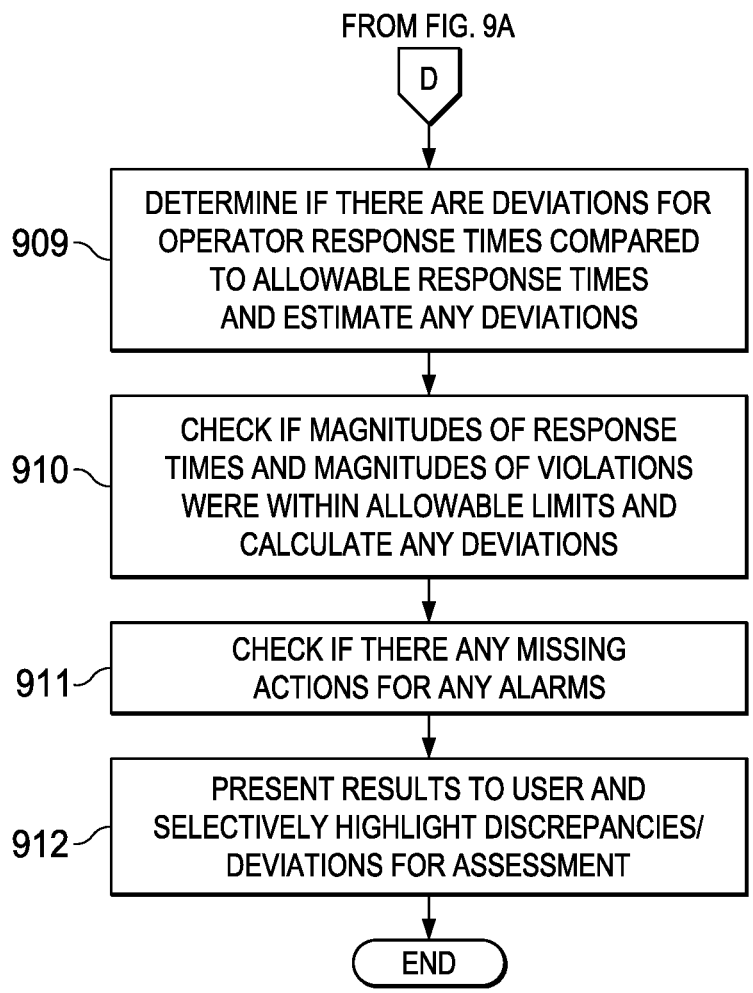

FIGS. 9A and 9B illustrate an example method 900 for assessing and evaluating operator responses according to this disclosure. Steps 901-904 may be the same as or similar to steps 501-504 discussed above, and the process could skip to step 905 if the user elects not to resolve nuisance alarms.

A determination is made whether evaluation of operator response should be performed at step 905. This could include, for example, the processor 202 determining whether a user has indicated that adequate alarm to operator action relationships have been identified. If new alarm to operator action relationships are needed, additional relationships are identified at step 906. This could include, for example, the processor 202 performing the method 800 of FIG. 8. When a graph structure is used to represent data, new relationships can be appended to the graph structure by the addition of new vertices, edges, and corresponding weights.

Approved relationships between alarms and operator actions are obtained at step 907. This could include, for example, the processor 202 obtaining the approved relationships from the knowledge model 312, along with settings such as operating conditions, allowable response times, magnitudes of response limits, and magnitudes of violation limits for the relationships. For the alarms in the historical data, the operator response times for the alarms are estimated at step 908. During this step, the processor 202 can consider whether different operating conditions may need different operator responses.

A determination is made as to whether there are deviations for the operator response times from an allowable response time to verify timely responses, and any deviations are estimated at step 909. For example, if the allowable response time is ten minutes and the actual response time is fifteen minutes, there is a deviation of five minutes. The magnitudes of response limits and the magnitudes of violation limits are also checked against allowable limits to verify for proper responses, and any deviations are calculated at step 910. For instance, a user could have increased an output value more than a prescribed limit (such as 30% against an allowable 20% magnitude), or the user could have allowed an alarm deviation to go beyond prescribed limits (such as 15 against an allowable 5). A check is made for any missing actions for any of the alarms at step 911. For example, there may be alarm instances where no operator actions could be located.

The results are presented to the user at step 912. For example, the processor 202 could generate a graphical display presenting highlighting deviations like delays in response times, deviations with respect to magnitudes of response limits and magnitudes of violation limits, or missing operator actions/responses. These results can help the user to evaluate and assess the operator responses easily, including whether proper operator responses occurred.

The functionality of the alarm management tool 304 can further be used to provide various processes for diagnosing incidents (such as alarm floods or plant upsets) and performing incident root cause analyses. Generally, alarm floods and plant upsets are situations where the rate of alarm annunciations is very high. While investigating periods containing alarm floods or plant upsets, it may be useful for a user to know if there are any similar events or alarm patterns during the period. It may also be useful for the user to know if a flood or plant upset was the result of a group of alarms caused by a failure of a single device or a system having multiple devices (trip or shutdown). For known event patterns, alarm groups (such as from the knowledge model 312) identified during incident diagnosis or root cause analysis, the causes, consequences, and resolutions can be identified from the knowledge model 312.

Figure 10:
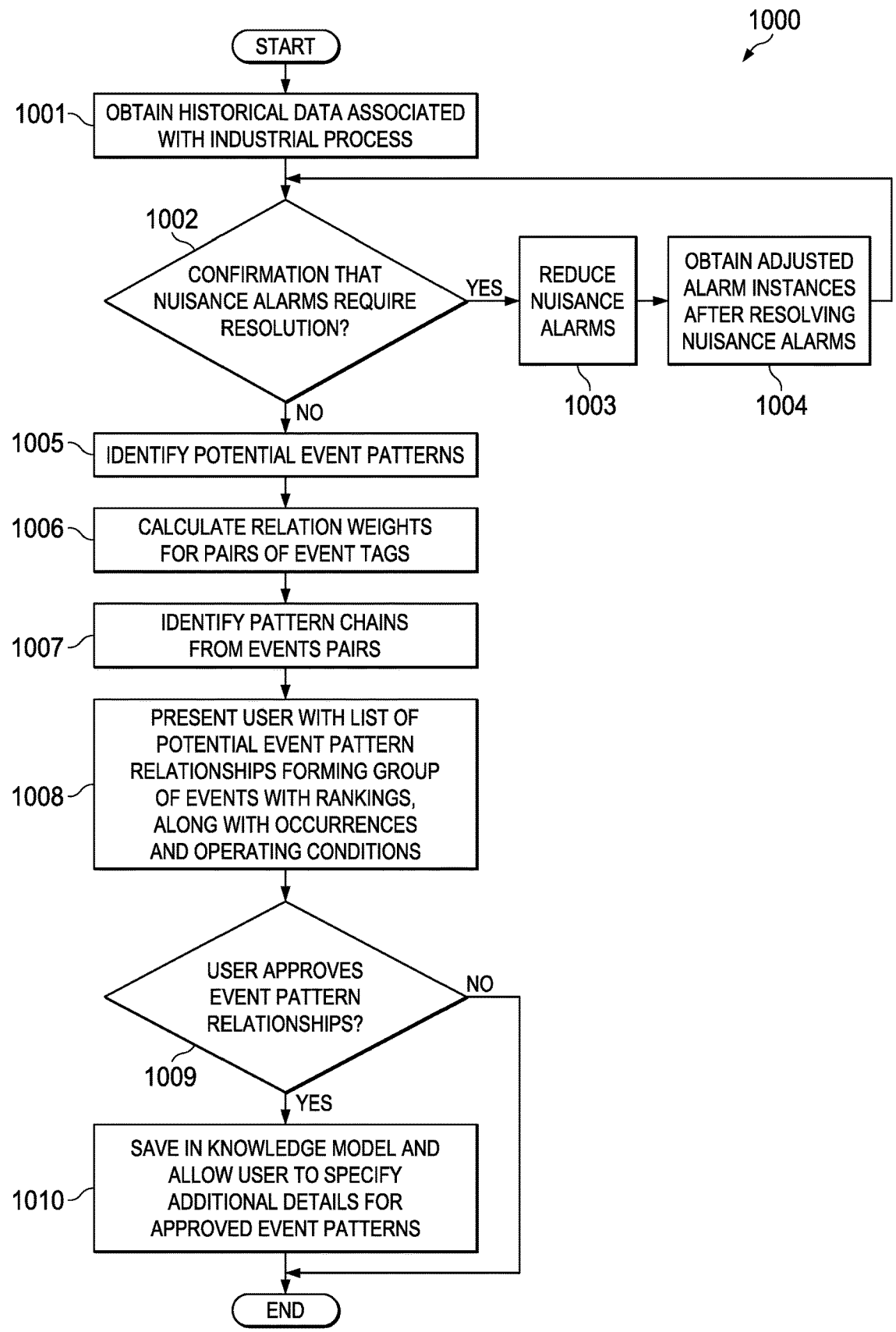
FIG. 10 illustrates an example method for finding event patterns according to this disclosure.

FIG. 10 illustrates an example method 1000 for finding event patterns according to this disclosure. Steps 1001-1004 may be the same as or similar to steps 501-504 discussed above, and the process could skip to step 1005 if the user elects not to resolve nuisance alarms.

Data analytics are used to identify potential event patterns at step 1005. This could include, for example, the processor 202 using data analytics to identify potential patterns in alarms. Event pattern relationships can include different types of events (such as process events, alarms, and operator responses). Relation weights are calculated for pairs of event tags, such as within a context, at step 1006. Here, predictability can be calculated as the probability that, if an event occurs, a second event will follow immediately (within a specified time window). Significance can be calculated as the probability that, when the second event occurs, the previous event has occurred recently (within a specified time window). In some embodiments, the calculated values are organized and stored in a graph structure.

From events pairs, pattern chains can be found at step 1007. This could include, for example, the processor 202 using combinatorial pattern matching to identify the pattern chains. A list of potential pattern relationships is presented to a user at step 1008. This could include, for example, the processor 202 generating a graphical display identifying a list of the potential event pattern relationships forming a group of events, along with rankings based on degrees of relationship, occurrences in history, and operating conditions. This information could be presented to the user as a list, where the user could select and approve the appropriate event pattern relationships.

The user may approve event pattern relationships at step 1009. If so, the approved event pattern relationships and operating conditions are saved, and the user could specify additional details for the approved event patterns at step 1010. This could include, for example, the processor 202 storing information about the approved event pattern relationships in the knowledge model 312. This could also include the processor 202 receiving typical causes, resolutions, and consequences from the user and storing this information in the knowledge model 312. The additional information may be useful for diagnosing incidents and performing incident root cause analysis.

Figure 11A:
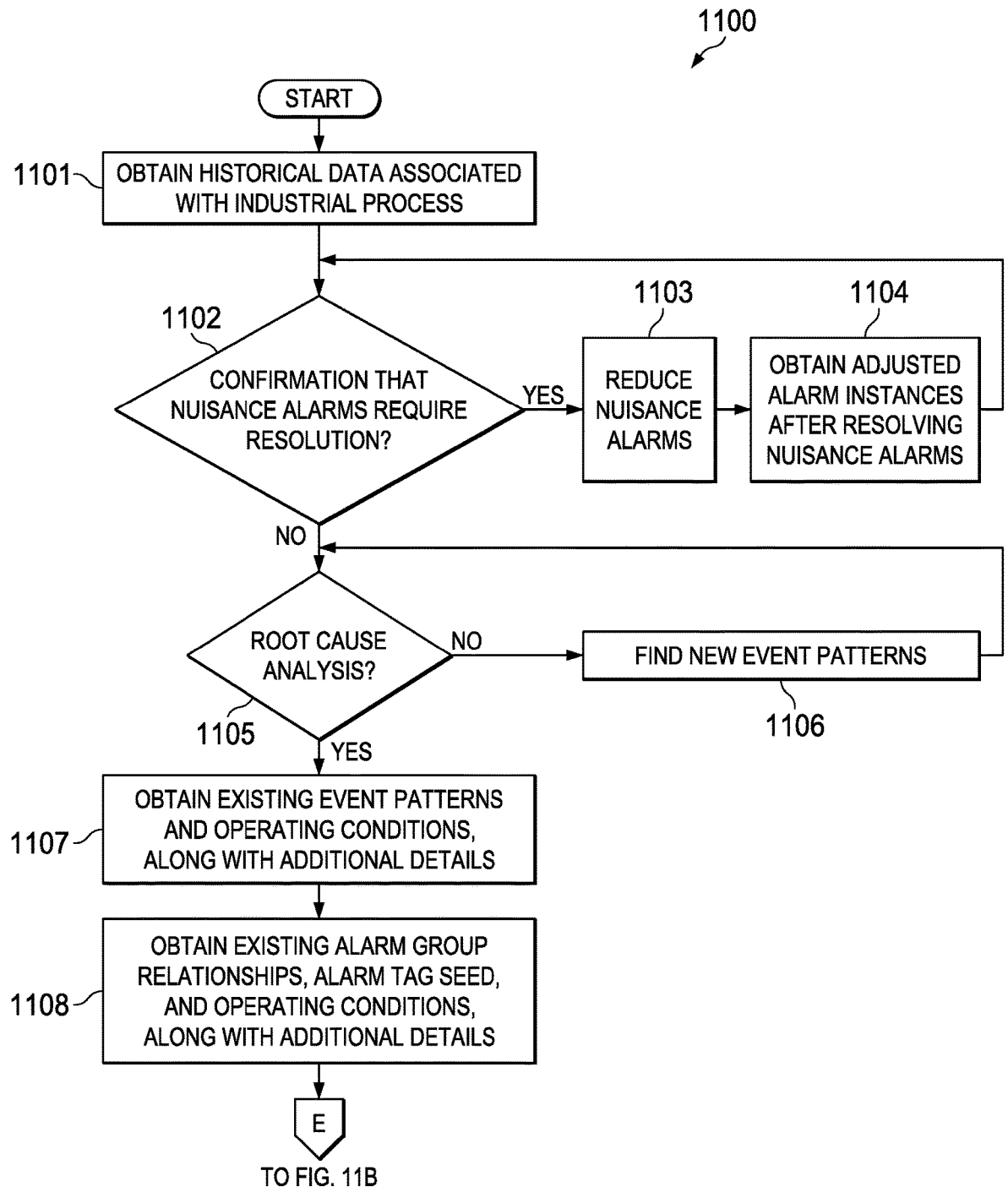
FIGS. 11A and 11B illustrate an example method for diagnosing incidents and performing incident root cause analysis according to this disclosure.
Figure 11B:
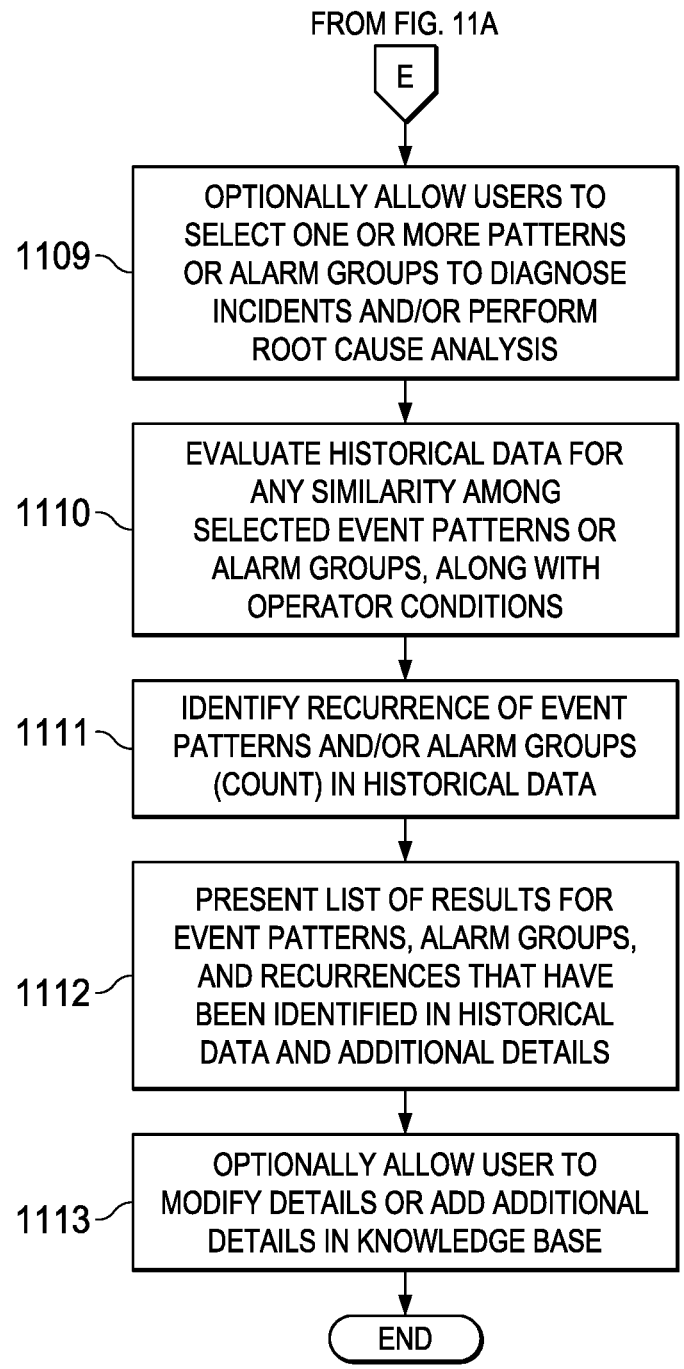

FIGS. 11A and 11B illustrate an example method 1100 for diagnosing incidents and performing incident root cause analysis according to this disclosure. Steps 1101-1104 may be the same as or similar to steps 501-504 discussed above, and the process could skip to step 1105 if the user elects not to resolve nuisance alarms.

A determination is made whether to diagnose incidents and perform root cause analysis based on existing event patterns and alarm groups at step 1105. This could include, for example, the processor 202 determining whether a user has indicated that adequate event patterns have been identified. If not, new event patterns are found at step 1106, such as by performing the method 1000 of FIG. 10 described above.

Existing event patterns and operating conditions, along with additional details, are obtained at step 1107. This could include, for example, the processor 202 obtaining the event patterns and operating conditions from the knowledge model 312, along with additional details such as causes, consequences, and resolutions associated with the event patterns. Existing alarm group relationships, alarm tag seeds, and operating conditions, along with additional details, are obtained at step 1108. This could include, for example, the processor 202 obtaining the alarm group relationships, alarm tag seeds, and operating conditions from the knowledge model 312, along with additional details like typical causes, resolutions, and consequences associated with the alarm group relationships. Optionally, the user may select one or more patterns or alarm groups for diagnosing incidents and performing root cause analysis at step 1109.

The historical data is analyzed for any similarities among selected event patterns or alarm groups at step 1110. This could include, for example, the processor 202 analyzing the historical data to determine whether events in the historical data are similar to or match the event patterns or alarm groups. Operator actions can also be considered here. The recurrence of the event patterns and alarm groups in the historical data are identified at step 1111. This could include, for example, the processor 202 determining the counts or number of times that event patterns and alarm groups occur in the historical data.

The results for the event patterns and alarm groups are presented at step 1112. This could include, for example, the processor 202 generating a graphical display that lists the event patterns and alarm groups and their associated counts, along with recurrences that have been identified in the historical data and related details like causes, consequences, and resolutions. Among other things, this can be used to aid users in diagnosing incidents. For instance, a user can verify if an event pattern or alarm group is recurring many times during a plant upset and can determine if similar event patterns or alarm groups are observed during different plant upsets. The additional details such as causes, consequences, and resolutions from the knowledge model 312 can aid in the performance of incident root cause analysis.

Based on the current incident root cause analysis, the user may optionally modify details at step 1113. This could include, for example, the processor 202 receiving updated information defining causes, consequences, or resolutions for the event patterns or alarm groups. This could also include the processor 202 receiving additional details that would enable better incident diagnosis or root cause analysis for the future. This information could then be stored in the knowledge model 312.

Although FIGS. 4A through 11B have illustrated example methods for analytics-driven alarm rationalization, assessment of operator response, and incident diagnosis, various changes may be made to FIGS. 4A through 11B. For example, while each method is shown as a series of steps, various steps in each method could overlap, occur in parallel, occur in a different order, or occur any number of times.

FIG. 12 illustrates an example decision matrix 1200 that can be presented to a user according to this disclosure. The decision matrix 1200 could, for example, be generated by the processor 202 and presented to a user at step 406 in the method 400 of FIG. 4. The decision matrix 1200 could be used to support the reduction of nuisance alarms.

As shown in FIG. 12, the decision matrix 1200 includes multiple cells 1202 arranged in rows and columns. Each cell 1202 associates a value of a timer off delay and a value of a timer on delay, which are arranged along the two axes of the decision matrix 1200. Each cell 1202 here contains a value denoting a percentage in alarm count reduction obtained using the different timer off delays and timer on delays. For example, setting each timer to five seconds in this example reduces the overall alarm count by 33%. One or more decision matrices 1200 can be presented to a user so that the user can review how one or more sets of alarm settings result in changes to the alarm counts.

Although FIG. 12 illustrates one example of a decision matrix 1200 that can be presented to a user, various changes may be made to FIG. 12. For example, the contents of the decision matrix 1200 in FIG. 12 are for illustration only.

FIG. 13 illustrates example contents of a knowledge model 312 supporting rationalization and resolution of alarms according to this disclosure. As described above, the knowledge model 312 is used to store various information used by the alarm management tool 304. As shown in FIG. 13, the knowledge model 312 can store data defining one or more graphs having vertices 1302 and edges 1304. The vertices 1302 can represent alarm, operator actions, or events. The edges 1304 can represent associations between the various tags 1302. As noted above, probabilities of tags being associated can include predictability and significance values, which can be represented by the edges 1304.

The first two rows in FIG. 13 show simple associations of two tags with a single connecting edge. The top row associates two alarm tags, which may have some relationship (such as being duplicate or consequential alarms or in an alarm group). The second row associates one alarm tag and one operator action tag, which could indicate that the operator action took place in response to the alarm tag. The last graph portion includes six tags (four alarm tags and two operator tags) that have a more complex relationship. This can be extended for any number of alarm, event, operator action, or other tags.

The knowledge model 312 could also include at least one table 1306 storing alarm groups and probabilities for those groups. As noted above, an alarm group represents a group of alarms that are likely to appear together, such as by being caused by a common cause.

Although FIG. 13 illustrates one example of the contents of a knowledge model 312 supporting rationalization and resolution of alarms, various changes may be made to FIG. 13. For example, the contents of the knowledge model 312 in FIG. 13 are for illustration only. Also, the use of vertices, edges, and tables denote logical ways that data can be associated, but that data could be physically stored and associated in any suitable manner.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
identifying a plurality of changes in an alarm count for at least one alarm to be generated in an industrial process control and automation system, wherein each change of the plurality of changes in the alarm count is based on an analysis of historical alarm data including alarm tags, operator action tags, and a corresponding set of alarm settings selected from among a plurality of different sets of alarm settings, wherein each set of alarm settings corresponds to a distinct set of values for the alarm settings forming the set and for each of multiple alarm tags a probability of occurrence is determined that one of the alarm tags will appear with another of the alarm tags in a group;
presenting the sets of alarm settings and the corresponding changes in the alarm count to a user together with a recommendation to suppress a specified alarm tag based on its probability of occurrence;
receiving at least one of a selection of one of the sets of alarm settings and a decision to suppress the specified alarm tag from the user; and
configuring the industrial process control and automation system with at least one of the selected set of alarm settings and decision to suppress the specified alarm tag to enable the industrial process control and automation system to at least one of adjust its performance and generate the at least one alarm using the selected set of alarm settings.

2. The method of claim 1, wherein, for each of at least some of the sets of alarm settings, the changes in the alarm count identify a reduced number of alarms to be generated by the industrial process control and automation system.

3. The method of claim 1, wherein each of the sets of alarm settings includes one or more timer settings and a dead band setting.

4. The method of claim 1, wherein presenting the changes in the alarm count comprises presenting the changes in the alarm count in a decision matrix.

5. The method of claim 1, further comprising generating the set of values corresponding to at least one of the sets of alarm settings based on set values contained in a knowledge model.

6. The method of claim 1, further comprising:
receiving at least one approval to configure the industrial process control and automation system with the selected set of alarm settings.

7. A system comprising:
at least one processing device configured to:
identify a plurality of changes in an alarm count for at least one alarm to be generated in an industrial process control and automation system, wherein each change of the plurality of changes in the alarm count is based on an analysis of historical alarm data including alarm tags, operator action tags, and a corresponding set of alarm settings selected from among a plurality of different sets of alarm settings, wherein each set of alarm settings corresponds to a distinct set of values for the alarm settings forming the set and for each of multiple alarm tags a probability of occurrence is determined that one of the alarm tags will appear with another of the alarm tags in a group;
present the sets of alarm settings and the corresponding changes in the alarm count to a user together with a recommendation to suppress a specified alarm tag based on its probability of occurrence;
receive at least one of a selection of one of the sets of alarm settings and a decision to suppress the specified alarm tag from the us; and
configure the industrial process control and automation system with at least one of the selected set of alarm settings and decision to suppress the specified alarm tag to enable the industrial process control and automation system to at least one of adjust its performance and generate the at least one alarm using the selected set of alarm settings.

8. The system of claim 7, wherein, for each of at least some of the sets of alarm settings, the changes in the alarm count identify a reduced number of alarms to be generated by the industrial process control and automation system.

9. The system of claim 7, wherein each of the sets of alarm settings includes one or more timer settings and a dead band setting.

10. The system of claim 7, wherein the at least one processing device is configured to present the changes in the alarm count in a decision matrix.

11. The system of claim 7, wherein the at least one processing device is further configured to:
generate the set of values corresponding to at least one of the sets of alarm settings based on seed values contained in a knowledge model.

12. The system of claim 7, wherein the at least one processing device is further configured to:

receive at least one approval to configure the industrial process control and automation system with the selected set of alarm settings.

13. A non-transitory computer readable medium containing instructions that, when executed by at least one processing device, cause the at least one processing device to:
identify a plurality of changes in an alarm count for at least one alarm to be generated in an industrial process control and automation system, wherein each change of the plurality of changes in the alarm count is based on an analysis of historical alarm data including alarm tags, operator action tags, and a corresponding set of alarm settings selected from among a plurality of different sets of alarm settings, wherein each set of alarm settings corresponds to a distinct set of values for the alarm settings forming the set and for each of multiple alarm tags a probability of occurrence is determined that one of the alarm tags will appear with another of the alarm tags in a group;
present the sets of alarm settings and the corresponding changes in the alarm count to a user together with a recommendation to suppress a specified alarm tag based on its probability of occurrence;
receive at least one of a selection of one of the sets of alarm settings and a decision to suppress the specified alarm tag from the user; and
configure the industrial process control and automation system with at least one of the selected set of alarm settings and decision to suppress the specified alarm tag to enable the industrial process control and automation system to at least one of adjust its performance and generate the at least one alarm using the selected set of alarm settings.

14. The non-transitory computer readable medium of claim 13, wherein, for each of at least some of the sets of alarm settings, the changes in the alarm count identify a reduced number of alarms to be generated by the industrial process control and automation system.

15. The non-transitory computer readable medium of claim 13, wherein each of the sets of alarm settings includes one or more timer settings and a dead band setting.

16. The non-transitory computer readable medium of claim 13, wherein the instructions to present the changes in the alarm count comprise instructions to present the changes in the alarm count in a decision matrix.

17. The non-transitory computer readable medium of claim 13, wherein the instructions further cause the at least one processing device to:
generate the set of values corresponding to at least one of the sets of alarm settings based on seed values contained in a knowledge model.

18. The non-transitory computer readable medium of claim 13, wherein the instructions further cause the at least one processing device to:
receive at least one approval to configure the industrial process control and automation system with the selected set of alarm settings.

19. The method of claim 1, wherein each of the sets of alarm settings includes an alarm timer off delay and an alarm timer on delay.

20. The system of claim 7, wherein each of the sets of alarm settings includes an alarm timer off delay and an alarm timer on delay.

* * * * *